(12) United States Patent
Kraenzel et al.

(10) Patent No.: US 7,853,574 B2
(45) Date of Patent: Dec. 14, 2010

(54) METHOD OF GENERATING A CONTEXT-INFERENCED SEARCH QUERY AND OF SORTING A RESULT OF THE QUERY

(75) Inventors: Carl J. Kraenzel, Boston, MA (US);
Paul B. Moody, Hyde Park, VT (US);
Joann Ruvolo, San Jose, CA (US);
Thomas P. Moran, Palo Alto, CA (US);
Justin T. Lessler, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 1676 days.

(21) Appl. No.: 10/926,735

(22) Filed: Aug. 26, 2004

(65) Prior Publication Data

US 2006/0047635 A1    Mar. 2, 2006

(51) Int. Cl.
*G06F 17/30* (2006.01)
(52) U.S. Cl. .................. 707/705; 707/706; 707/723; 707/769; 707/770; 707/771
(58) Field of Classification Search ............. 707/4, 707/3, 7, 999.001, 999.003, 999.004, 999.007, 707/705, 706, 723, 769, 770, 771
See application file for complete search history.

(56) References Cited

U.S. PATENT DOCUMENTS 5,771,378 A * 6/1998 Holt et al. ...................... 1/1
5,842,009 A 11/1998 Borovoy et al.
6,014,661 A * 1/2000 Ahlberg et al. ................ 1/1
6,041,323 A * 3/2000 Kubota ......................... 1/1
6,098,034 A * 8/2000 Razin et al. .................. 704/9
6,249,784 B1 * 6/2001 Macke et al. .................. 1/1
6,363,377 B1 * 3/2002 Kravets et al. ................ 1/1
6,405,195 B1 * 6/2002 Ahlberg ..................... 709/219
6,480,830 B1 11/2002 Ford et al.
6,697,793 B2 * 2/2004 McGreevy ..................... 1/1
6,721,728 B2 * 4/2004 McGreevy ..................... 1/1
6,738,759 B1 * 5/2004 Wheeler et al. ............. 707/741
6,741,981 B2 * 5/2004 McGreevy ..................... 1/1
6,823,333 B2 * 11/2004 McGreevy ..................... 1/1
6,920,459 B2 * 7/2005 Dedhia et al. .............. 707/740
7,003,513 B2 * 2/2006 Geiselhart ...................... 1/1
7,058,624 B2 * 6/2006 Masters ..................... 707/723
7,113,954 B2 * 9/2006 Vogel ........................ 707/737

* cited by examiner

*Primary Examiner*—Don Wong
*Assistant Examiner*—Thanh-Ha Dang
(74) *Attorney, Agent, or Firm*—Guerin & Rodriguez, LLP; Michael A. Rodriguez

(57) ABSTRACT

A method of generating a context-inferenced search query and of sorting a result of the query is described. The method includes analyzing an event associated with the user to determine a contextual setting, dynamically generating a search query based on the contextual setting, and searching at least one information source using the search query to generate a search result. Additionally, the method includes calculating an importance value for each item of the search result, sorting the items of the search result according the importance value, and displaying the sorted search result to the user.

12 Claims, 3 Drawing Sheets

METHOD OF GENERATING A CONTEXT-INFERENCED SEARCH QUERY AND OF SORTING A RESULT OF THE QUERY

FIELD OF THE INVENTION

The invention relates to computerized searching. More specifically, the invention relates to searching documents and displaying the results of the search based on contextual information associated with a user.

BACKGROUND OF THE INVENTION

Search utilities are common throughout various computing environments such as the world-wide-web and in various computer applications such as electronic mail, word processing, and other desktop applications. A large number of computer users still only enter a single search term into the search utility, because complex search queries are difficult for the average computer user to construct. As a result, the search utility often returns an overwhelming amount of data that satisfies the search query. The user manually sorts through the search results to find the desired information.

To address this problem, programmers developed various mechanisms to aid computer users in constructing search queries. One such mechanism is Query by Example (QBE), which is a method of query creation that allows the computer user to search for documents based on an example in the form of a selected text string, a document name, or a list of documents. Because the QBE system formulates the actual query, QBE is easier to learn than formal query languages, such as the standard Structured Query Language (SQL), and can produce powerful searches. For example, in QBE the location of the user's cursor on a computer display can be used to determine if the user is looking at his or her calendar program. The user can highlight a term of calendar entry and ask the QBE mechanism to search for other documents containing that term.

Often, the result of the QBE is displayed to the user based on a single property (e.g., a date or a keyword). For example, a document containing an exact match of the QBE term is determined to be more likely of interest to the user than a document containing a derivative of the QBE term. Accordingly, the result of the QBE is displayed to the user based upon this assumption. However, in some circumstances the user may actually be more interested in the document containing the derivative of the QBE term, because the user may have an upcoming event focused on the derivative QBE term. Basing the QBE search results on a single property often does not produce an accurate reflection of what is important to the user.

SUMMARY OF THE INVENTION

In one aspect, the invention features a method of organizing and presenting information to a user based on a present or past contextual setting of the user. The method includes analyzing an event associated with the user to determine a contextual setting, dynamically generating a search query based on the contextual setting, and searching at least one information source using the search query to generate a search result. Additionally, the method includes calculating an importance value for each item of the search result, sorting the items of the search result according the importance value, and displaying the sorted search result to the user.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The present invention relates to a software application for searching, organizing, and presenting a result of a dynamically generated search query to a user of the software application. The functionality of the software application can be incorporated into existing applications such as office applications, email applications, and time management applications. Alternatively, the software application of the present invention can be a stand-alone application. The software application retrieves documents from various sources. As used herein, the term documents includes, but is not limited to, e-mail messages, meetings notices, calendar entries, task list items, instant messages, web pages, word processing files, presentation files, spreadsheet files, database records, and the like.

The dynamic search query and its associated result are generated based on a contextual setting of the user. As used herein, the contextual setting for the dynamic search query refers to past, present and future events such as meetings, conference calls, video conferences and the like that are important to the user. Refining functions, which are also based on a contextual setting, operate on the returned results of the search engine to provide further values for ranking the returned search results. A contextual setting for refining refers to all of the personal information of the user, including but not limited to email, events, and documents of the user. A combiner analyzes the results of the refining functions and the search results to provide a final ordering of the search results. The software application presents the final ordering to a user. The final ordering indicates an order of importance or priority to the user.

Figure 1:
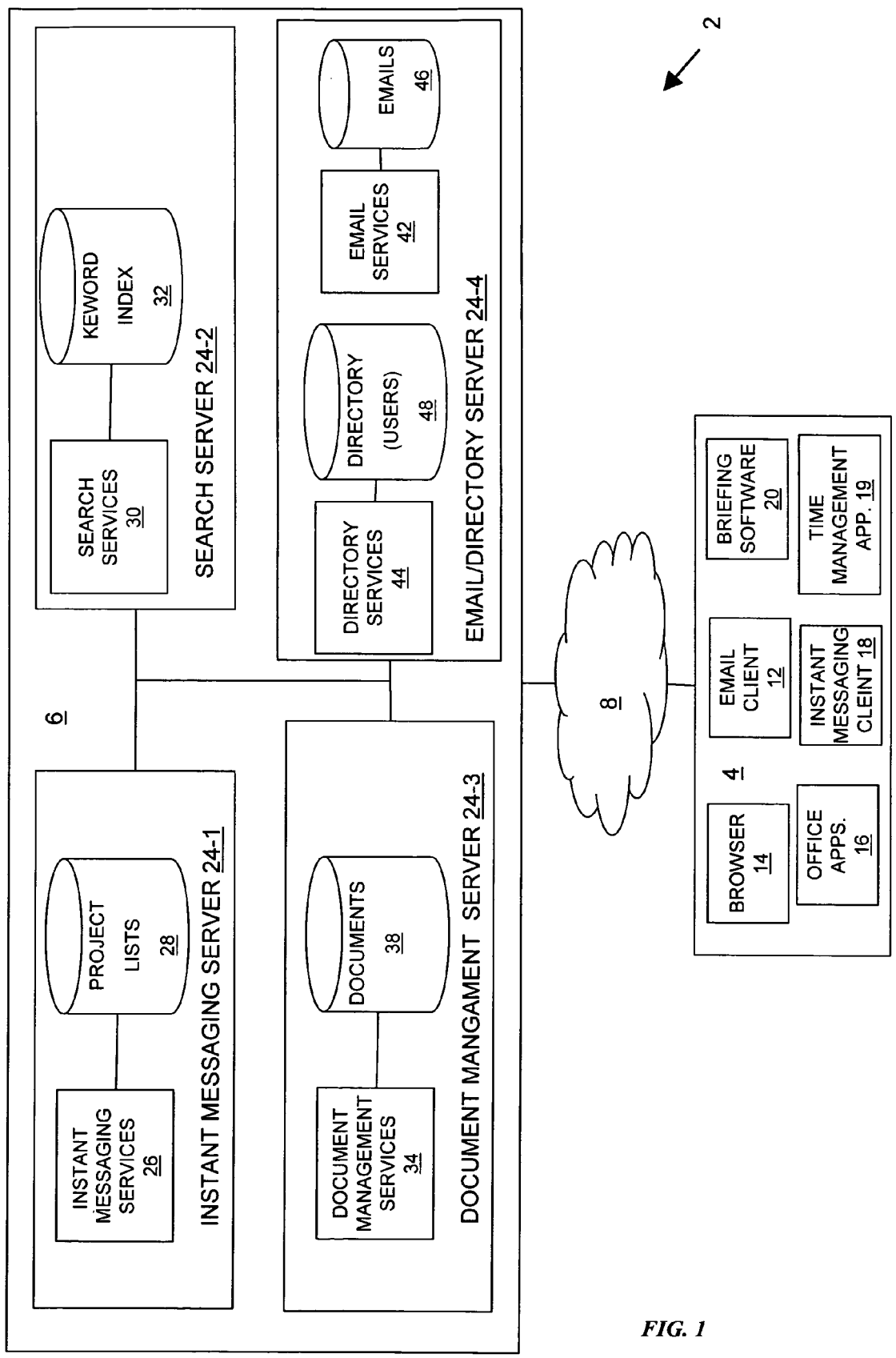
FIG. 1 is a block diagram of an embodiment of client-server environment within which the present invention can operate.

FIG. 1 shows an embodiment of a computing environment 2 in which the invention can be practiced. The computing environment 2 includes a client system 4 in communication with a server system 6 over a network 8. The client system 4 can be any personal computer (e.g., 486, Pentium, Pentium II, Macintosh), Windows-based terminal, wireless device, information appliance, RISC Power PC, X-device, workstation, mini-computer, mainframe computer, cell phone, personal digital assistant (PDA) or other computing device that has hardware such as a display screen, one or more input devices (e.g., keypad, stylus, keyboard, mouse, touch-pad, and trackball), a processor for executing application programs, and sufficient persistent storage for storing such application programs and related information.

Application programs on the client system 4 include, but are not limited to, an electronic mail client program 12, browser software 14, office applications 16 such as a spread sheet, a word processor, and a slide presentation, an instant messaging program 18, a time management application 19, and briefing software 20. The email client program 12, browser software 14, office applications 16, instant messaging program 18, time management application 19, and briefing software 20 can be a proprietary or commercially available program, such as Lotus WORKPLACE™ for email, time management, and briefing, Lotus Same Time for instant messaging, Microsoft Internet Explorer™ for browser software, and Microsoft WORD for word processing. The browser software 14 can incorporate a JAVA™ virtual machine for interpreting JAVA™ code (i.e., applets, scripts) and applications. The time management application 19 typically includes a calendar, communications, and task management functions. The briefing software 20 provides the functionality of the invention.

The application programs execute within an operating system. Examples of operating systems supported by the client system 4 include Windows 95, Windows 98, Windows NT 4.0, Windows XP, Windows 2000, Windows CE, Macintosh, Java, LINUX, and UNIX. The client system 4 also includes a network interface (not shown) for communicating over the network 8. The network 8 can be a local-area network (LAN), a metro-area network (MAN), or wide-area network (WAN), such as the Internet or World Wide Web. Users of the client system 4 can connect to the network 8 through one of a variety of connections, such as standard telephone lines, digital subscriber line, LAN or WAN links (e.g., T1, T3), broadband connections (Frame Relay, ATM), and wireless connections (e.g., 802.11(a), 802.11(b), 802.11(g)).

In one embodiment, the server system 6 includes an instant messaging server 24-1, a search server 24-2, a document management and application server 24-3, and an e-mail and directory server 24-4 (generally, server 24). Although shown separately, these servers 24 can be integrated in a single computing machine. Alternatively, different computing machines geographically collocated or distributed across the network 8, can be used to implement the server 24.

Each server 24 includes programs for performing particular services and persistent storage for keeping data related to those services. The instant messaging server 24-1 includes software 26 for providing instant messaging services and persistent storage 28 for storing all or some of the instant messages for a predetermined period of time. Components of the search server 24-2 are software 30 for performing search services and persistent storage 32 for maintaining an index of searching keywords to be used in searching for documents.

The document management and application server 24-3 includes software 34 for providing document management services. Documents managed by the document management software 34 reside in persistent storage 38. The e-mail and directory server 24-4 includes software 42 for supporting email communication among users on the network 8 and software 44 for providing directory services. The email services software 42 accesses persistent storage 46, which stores the email messages, and the directory services software 44 accesses user directory information in persistent storage 48. In a preferred embodiment, the briefing software 20 is integrated into the time management application 19. The briefing software 20 communicates with each of the email 12, browser 14, office 16, and instant messaging 18 applications and the instant messaging server 24-1, the search server 24-2, the document management and application server 24-3, and the e-mail and directory server 24-4 as required to retrieve documents related to the contextual setting of the user.

When a user activates the briefing software 20, the briefing software 20 of the client system 4 communicates over the network 8 with the server system 6 to accomplish the search and organizational activities of the invention. To communicate information across the network 8, in one embodiment, the client and server systems 4, 6 use standard transport protocols, such as TCP/IP and the hypertext transfer protocol (HTTP).

Figure 2:
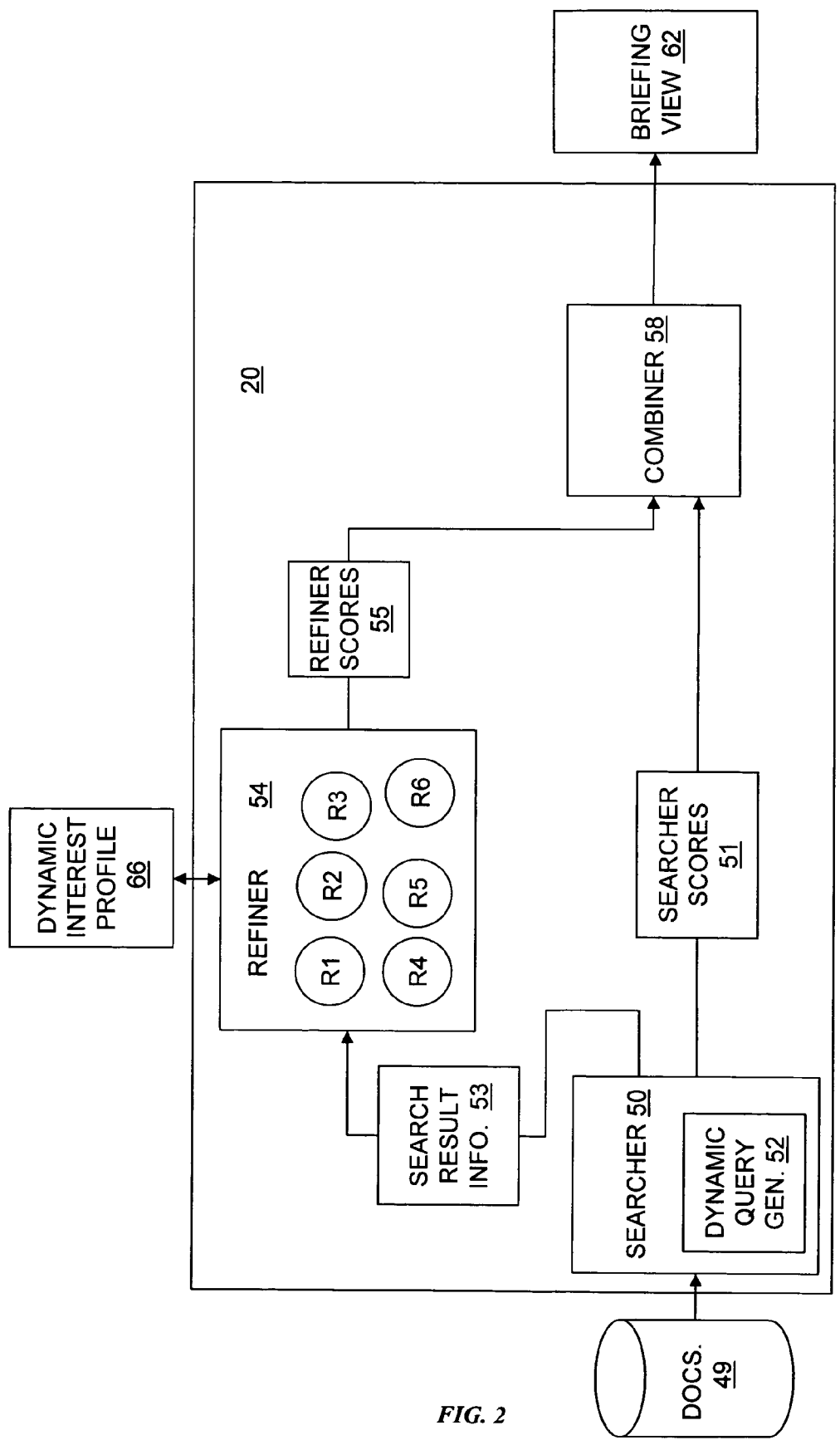
FIG. 2 is a conceptual block diagram of a software system according to principles of the invention.

FIG. 2 is a conceptual block diagram of an embodiment of the briefing software 20 of FIG. 1. The briefing software 20 includes searcher software 50, refiner software 54, and combiner software 58.

In general the searcher 50 includes a search engine for searching through the documents 49 in response to the dynamically generated search query produced by dynamic search query generator software 52. In some embodiments, the search engine can be a part of the search server 24-2, of the time management application 19, or of a stand-alone search engine. The searcher 50 includes a searching function for identifying documents in response to the dynamically generated search query of the invention and a ranking function for assigning search scores to each document identified by the searching function. The searcher 50 is in communication with the combiner 58 to forward a search score 51 for each document identified by the search function and with the refiner 54 to forward search result information 53 that correlates a search score to a respective document. The search result information 53 can be the documents identified by the searcher 50 or pointers to those documents.

The refiner 54 includes refining functions R1, R2, R3, R4, R5, and R6 (referred to generally as refining functions R). It should be understood that the invention is not limited to six refining functions. Instead any number of refining functions can be included as part of the briefing software 20. In general, each refining function analyzes the search result information 53 and provides a refiner score 55 for each document identified by the searcher 50. For example, one of the refining functions R can score a document based on who receives or authors the document. Another refining function R can score based on whether the document is a calendar entry or includes an attachment. Yet another refining function can score the document based on the temporal nature of the document. Each refining function can cause an increase or decrease in the ranking of the document within the briefing view 62. Each refining function R can be implemented as a software class that is called by the briefing software 20 while the briefing software 20 is executing.

Some parameters of the refining functions can be controlled by a dynamic interest profile 66 that is associated with the user of the briefing software 20. In general, the dynamic interest profile 66 includes various parameters related to the interests of the user. The parameters can be dynamically determined based upon the activities of the user, statically configured by the user, or be a combination of statically configured parameters and dynamically configured parameters. An example of a dynamically determined parameter is a value assigned to various authors of documents that are read by the user. As the user reads more documents authored by a particular user, the score associated with that author increases. An example of a statically configured parameter is a value that is set by the user to indicate a higher degree of relevance to the user of a receipt of a document.

For example, the refining function R1, referred to as the "recipient importance" refining function, scores documents retrieved by the searcher 50 based on the average importance of the recipients. The average importance is calculated by querying the user's dynamic interest profile 66 to retrieve an importance value for each recipient of the document. Expressed mathematically, the recipient importance refining function R1 can be expressed as:

$$f(d) = \begin{cases} \frac{1}{|S|} \sum_{r \in S} DipScore(r) & \text{if } |S| > 0 \\ 0 & \text{otherwise} \end{cases} \quad (1)$$

In equation 1, S is the set of recipients for the document that is being scored by the refining function R1. DipScore (r) is the score associated with the recipient. This value is retrieved from the dynamic interest profile 66 of the user of the briefing software 20.

The refining function R2, referred to as the "author importance" refining function, scores the documents retrieved by the searcher 50 based upon who authored the document. Mathematically, the author importance refining function R2 can be expressed as:

$$f(d) = DipScore(S) \quad (2).$$

In equation 2, the DipScore (S) relates to the importance of the author or sender of a document as viewed by the user of the briefing software 20. The dynamic interest profile 66 of the user of the briefing software 20 calculates a value DipScore (S) for certain authors of documents. The value DipScore (S) can be dynamically or manually configured in the dynamic interest profile 66. Generally, the value of DipScore (S) is determined by the user and user's habits related to the respective author. For example, documents authored by the user's manager may be of more importance to the user than documents authored by the other attendees of the meeting. Thus, the value calculated for DipScore (S) for the user's manager is greater than the value calculated for DipScore (S) for the other attendees.

The refining function R3, referred to as the "participant overlap" refining function, scores document that were sent by a non-meeting participant to each of the user and the meeting participants higher than documents that were sent by the non-meeting participant to only the user. Also, the participant overlap refining function R3 scores documents that are sent by meeting participants to the user or that were sent to the meeting participants by the user higher than documents that were not sent to or by meeting participants. For example, an email that was sent to a meeting participant is more likely to be relevant to the upcoming meeting when compared to an email that was sent to non-meeting participant. The participant overlap refining function R3 can be expressed mathematically as:

$$f(d) = \frac{|P \cap (N \cup S)|}{|P \cup N \cup S|}. \quad (3)$$

In equation 3, P represents the set of meeting participants, N represents the set of recipients of the document being scored, and S represents the author or sender of the document. The resulting score generated by the participant overlap refining function is associated with the document for use by the briefing software 20.

The refining function R4, referred to as the "calendar entry" refining function, scores the documents returned by the searcher 50 based on whether the document is a calendar entry. In one embodiment, the calendar entry refining function R4 increases the relevance of the document if the document is a calendar entry. For example, when the document is a calendar entry a scoring factor is applied to the document; however, if the document is not a calendar entry then the scoring factor is not applied. Expressed mathematically, the calendar entry refining function R4 can be viewed as:

$$f(d) = \begin{cases} 1 & \text{if the document is a calendar entry} \\ 0 & \text{otherwise} \end{cases} \quad (4)$$

This refining function accounts for the fact that upcoming events in the users calendar are important to the user.

Similar to the calendar entry refining function R4, the briefing software 20 includes the "attachment included" refining function R5 that scores the documents returned by the search engine based on whether the document includes an attachment. In one embodiment, the attachment included refining function R5 applies a scoring factor to the document when the document includes an attachment. Conversely, when the document does not include an attachment, the attachment refining function R5 does not apply the scoring factor to the document. A mathematical expression of the attachment included refining function R5 can be:

$$f(d) = \begin{cases} 1 & \text{if the document has an attachment} \\ 0 & \text{otherwise} \end{cases} \quad (5)$$

The refining function R6, referred to as the "time-based" refining function, scores the documents returned by the searcher 50 based on temporal parameters of the documents. In one embodiment, the time-based refining function R6 scores the documents based on when the document was created or on the time of the occurrence of the document (i.e., the time the document was received, the last time the document was modified, or the last time the document was accessed). Often documents that are created closer in time to the upcoming event are more relevant to the event and should be scored higher when compared to documents created two months prior to the upcoming event. For example, a document created one day prior to an upcoming meeting typically includes information that is up to date. Therefore, the score applied to the one-day old document is greater than the score applied to a document that was created two weeks ago. In one embodiment, the time-based refining function R6 is expressed mathematically as:

$$f(d) = \frac{1}{|t_e - t_d| + 1}. \quad (6)$$

In equation 6, $t_e$ represents the time of the upcoming or past event and $t_d$ represents the time of creation of the document or the time of occurrence of the document.

The resulting score generated by each of the refining functions R1, R2, R3, R4, R5, and R6 are associated with the document for use by the combiner 58. Although shown as having six refining functions R, the refiner 54 can include various numbers of refining functions R. Various combinations of the refining functions R are applied to the documents returned from the search 50. It is not required that every refining function R generate a score for each document returned by the searcher 50.

In one embodiment, the combiner 58 is a weighting algorithm that combines the scores returned from both the searcher 50 and the refiner 54 for each document. The combiner 58 applies a weighting algorithm having at least one weighting factor related to the contextual setting to each of the scores. The weighting applied to each of the refining function scores and the search result score can be dynamically determined based on the history of the user or manually set using the dynamic interest profile 66 of the user. The combining function produces the final rankings of the documents that are used to generate the briefing view 62.

Figure 3:
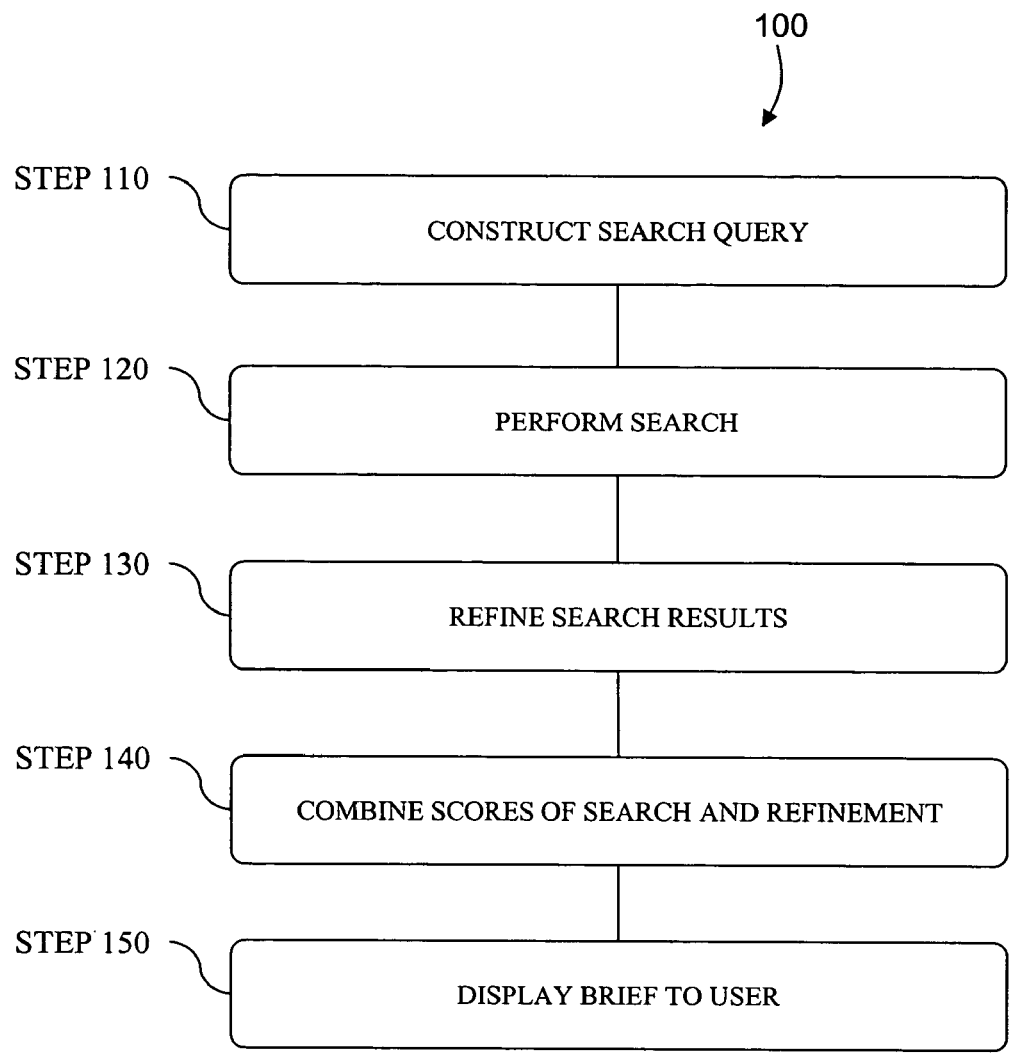
FIG. 3 is a flow chart of an embodiment of a method of organizing and presenting a search result to a user according to the principles of the invention.

FIG. 3 depicts an embodiment of a method 100 of operation of the briefing software 20. To generate the briefing view 62, the user launches the time management application 19 (e.g., Lotus WORKPLACE™) and selects the "briefing view" from the view menu of the time management application 19.

When the briefing view is selected, the dynamic query generation software 52 dynamically constructs (step 110) a search query based upon information within the time management application 19. For example, the dynamic query generation software 52 analyzes a calendar entry to determine the contextual setting for the user. In addition to calendar entries, the briefing software 20 can analyze email, instant messages, thread postings, task list items, reminder notices, or a combination thereof to dynamically generate the search query.

As an illustrative example, if a calendar entry reads "meet to discuss Windows patch deployment adoption" and lists the participants as Joe Smith, John Price, Fred Randolf, the resulting dynamically generated search query is:

text:meet, text:to, text:discuss, text:windows, text:patch, text:deployment, text:adoption, author:"joe smith", author:"john price", author:"fred randolf" sentto:"joe smith", sentto:"john price", sendto:"fred randolf."

In this example, text:x indicates that the body or subject of any returned document should contain text x, author:x indicates that the author of any returned document should contain text x, and sendto:x indicates that any returned document should have been sent to recipient x. In one embodiment, the dynamically generated search query is displayed to the user to allow the user to modify the dynamically generated search query.

The briefing software 20 requests (step 120) a search of the documents 49 accessible by the user using the dynamically generated search query. Documents fulfilling any subset of the dynamically generated search query conditions are returned by the searcher 50 and ranked based on a ranking algorithm associated with the searcher 50. Generally the searcher 50 scores documents based on the number of fulfilled search criteria; documents with more conditions fulfilled score higher than those documents with fewer fulfilled conditions. For example, referring to the previous exemplary search query an email (i.e., document D1) authored by John Price sent to Fred Randolph having a subject line "widows patch" scores higher than an email (i.e., document D2) authored by John Price sent to Joe Smith having a subject line "let's have lunch" having an attachment titled "windows patch deployment meeting".

The refiner 54 refines (step 130) the search results returned from the searcher 50. The various refining functions R of the refiner 54 operate on the search results to score each retrieved document. After any one or combination of refining functions operate on each document returned by the searcher 50, the combiner 58 combines (step 140) the scores produced by the search engine and the scores produced by the refining function to create an importance value for each document. After the final rankings are set, the briefing software 20 displays (step 150) the final result to the user.

The following example is provided to illustrate various features and advantages of the invention. Referring back to the search results above, the searcher 50 scores document D1 at 70.0 and D2 at 60.0. However, applying various refining functions R of the refiner 54 and using the refining results 55 in the combiner 58 alters the final rankings in the briefing view 62. In this example, the briefing software 20 applies the refining functions R1, R2, R3, R4, R5, and R6 to the documents returned from the searcher 50. Consider that each document was created at roughly the same time; therefore, the time based refining function R6 does not influence the final rankings in the briefing view 62. Similarly, the calendar entry refining function R4 does not influence the final rankings, because neither document D1 or D2 is a calendar entry. Each document has the same author; therefore, the author importance refining function R2 does not influence the ranking. Neither document D1 nor document D2 is from or sent to any other meeting participant than John Price so the participant overlap refining function R3 returns 0.0 for each of the documents D1, D2 and therefore does not influence the final ranking.

However, documents D1 and D2 have different recipients that are of greater and lesser importance to the user. Applying the recipient importance refining R1 returns different values for the documents D1, D2. For example, Fred Randolph (recipient of document D1) is the administrative assistant of John Price while Joe Smith (recipient of document D2) is the supervisor of John Price. Accessing the dynamic interest profile 66 of the user reveals that Fred Randolph has a recipient importance value of 10.0 and Joe Smith has a recipient importance value of 90.0.

The document D2 also includes an attachment, while document D1 does not. Therefore the attachment refining function R5 returns a score of 0.0 for document D1 and a score of 1.0 for document D2.

The combiner 58 uses a weighted linear combination function to calculate the final score for the documents D1, D2. In the weighted linear combination function, the searcher scores 51 are given a weight of 1.0, the recipient importance refiner R1 is given a weight of 0.1 and the attachment refiner R5 is given a weight of 3.0. For clarity, assume that all refining functions R that returned identical values for the two documents D1, D2 are ignored by the combiner 58. The combiner 58 assigns document D1 a final score of 71.0 which is calculated as shown in equation 7:

$$((1.0 \times 70.0)+(0.1 \times 10.0)+(3.0 \times 0.0)) \tag{7}$$

The combiner assigns document D2 a final score of 72.0 that is calculated as shown in equation 8:

$$((1.0 \times 60.0)+(0.1 \times 90.0)+(3.0 \times 1.0)) \tag{8}$$

Therefore in the briefing view 62 the document D2 is displayed as ranking higher than document D1. As shown, the operation of the refiner 54 and the combiner 58 reverse the final rankings of the documents D1 and D2 when compared to the searcher 50 alone.

Although described using a single calendar entry, the principles of the invention can be applied to multiple calendar entries and multiple other documents depending on the preference of the user. For example, if the user has multiple meetings scheduled for a particular day, the text for each of those meetings is used to create a compound search. In the returned search results, the documents related to the next scheduled meeting are displayed first. This concept can be applied to generate a "sliding window" of important documents related to the upcoming meetings of the user. To implement the sliding window concept, the user configures the briefing software 20 to run at predetermined intervals (e.g., every 15 minutes) so the resulting briefing view 62 generated by the briefing software 20 updates continually.

Another example of the sliding window concept includes not only upcoming events for the user, but includes recently completed events. A meeting that the user just attended may still be important to the user because, for example, the user was assigned action items as a result of the meeting. The briefing view 62 can include documents related to the recently completed event.

While the invention has been shown and described with reference to specific preferred embodiments, it should be understood by those skilled in the art that various changes in form and detail may be made therein without departing from the spirit and scope of the invention as defined by the following claims. For example, although described as a method and data file the invention can be embodied as a computer readable medium (e.g., compact disk, DVD, flash memory, and the like) that is sold and distributed in various commercial channels. Also, the computer readable instructions contained on the computer readable medium can be purchased and download across a network (e.g., Internet). Additionally, the invention can be embodied as a computer data signal embodied in a carrier wave for organizing and presenting information to a user.

What is claimed is:

1. A computerized method of organizing and presenting information to a user, comprising:
    analyzing, by a processor, a future event associated with the user to determine a contextual setting for the user;
    dynamically generating, by the processor, a search query based on the contextual setting;
    searching, by the processor, at least one information source using the search query to generate a search result;
    calculating, by the processor, an importance value for each item of the search result, the importance value indicative of the contextual setting;
    sorting, by the processor, the items of the search result according to the importance value; and
    displaying the sorted search result to the user.

2. The computerized method of claim 1, wherein the analyzing further comprises analyzing a past event associated with the user to determine the contextual setting.

3. The computerized method of claim 1, further comprising analyzing at least one of a past event of the user, a future event of the user, and personal information of the user to generate a dynamic interest profile for the user and wherein the dynamically generating of the search query comprises extracting data from the dynamic interest profile and the contextual setting to generate the search query.

4. The computerized method of claim 1, wherein calculating the importance value comprises applying a weighting algorithm to each item of the search result, the weighting algorithm comprising weighting factors related to the contextual setting.

5. A computer readable storage medium for organizing and presenting information to a user, the computer readable storage medium comprising instructions to cause a processor to:
    analyze a future event associated with the user to determine a contextual setting for the user;
    dynamically generate a search query based on the contextual setting;
    search at least one information source using the search query to generate a search result;
    calculate an importance value for each item of the search result, the importance value indicative of the contextual setting;
    sort the items of the search result according to the importance value; and
    display the sorted search result to the user.

6. The computer readable storage medium of claim 5, wherein the instructions to analyze a future event further comprises instructions to analyze a past event associated with the user to determine the contextual setting.

7. The computer readable storage medium of claim 6, further comprising instructions to analyze at least one of a past event of the user, a future event of the user, and personal information of the user to generate a dynamic interest profile for the user and wherein the instructions to dynamically generate the search query comprises instructions to extract data from the dynamic interest profile and the contextual setting to generate the search query.

8. The computer readable storage medium of claim 6, wherein the instructions to calculate the importance value comprises instructions to apply a weighting algorithm to each item of the search result, the weighting algorithm comprising weighting factors related to the contextual setting.

9. An apparatus for organizing and presenting information to a user, the apparatus comprising:
    a processor;
    means for analyzing a future event associated with the user to determine a contextual setting;
    means for dynamically generating a search query based on the contextual setting;
    means for searching at least one information source using the search query to generate a search result;
    means for calculating an importance value for each item of the search result, the importance value indicative of the contextual setting;
    means for sorting the items of the search result according to the importance value; and
    means for displaying the sorted search result to the user.

10. The apparatus of claim 9, wherein the means for analyzing comprises means for analyzing a past event associated with the user to determine the contextual setting.

11. The apparatus of claim 9, further comprising means for analyzing at least one of a past event of the user, a future event of the user, and personal information of the user to generate a dynamic interest profile for the user and wherein the means for dynamically generating the search query comprises means for extracting data from the dynamic interest profile and the contextual setting to generate the search query.

12. The apparatus of claim 9, wherein the means for calculating the importance value comprises means for applying a weighting algorithm to each item of the search result, the weighting algorithm comprising weighting factors related to the contextual setting.

* * * * *